United States Patent [19]

Tanner

[11] 4,170,767
[45] Oct. 9, 1979

[54] VISUAL APPROACH SYSTEM FOR AIRCRAFT

[76] Inventor: Jesse H. Tanner, 3201 S. 192nd, Apt. 312, Seattle, Wash. 98188

[21] Appl. No.: 819,269

[22] Filed: Jul. 27, 1977

Related U.S. Application Data

[63] Continuation-in-part of Ser. No. 772,077, Feb. 25, 1977, abandoned.

[51] Int. Cl.$^2$ ............................................. G08G 5/00
[52] U.S. Cl. ......................................... 340/26; 362/62
[58] Field of Search ........................... 340/26, 25, 62; 244/114 R; 356/136; 362/382, 62, 223, 351, 356; 350/319

[56] References Cited

U.S. PATENT DOCUMENTS

| | | | |
|---|---|---|---|
| 2,441,877 | 5/1948 | Flett | 340/26 |
| 2,968,023 | 1/1961 | Ferguson et al. | 340/26 |
| 2,975,400 | 3/1961 | Ferguson et al. | 340/26 |
| 3,191,146 | 6/1965 | Mitchell | 340/26 |
| 3,447,128 | 5/1969 | Birmingham et al. | 340/26 |
| 3,531,765 | 9/1970 | Christianson et al. | 340/26 |
| 3,810,150 | 5/1974 | Jacobs | 340/26 |

Primary Examiner—John W. Caldwell, Sr.
Assistant Examiner—James J. Groody
Attorney, Agent, or Firm—Seed, Berry, Vernon & Baynham

[57] ABSTRACT

A visual approach system for indicating the glide slope and course of an aircraft to a runway. The system includes a plurality of light beam generators of various colors enclosed by tubular light shields for precisely controlling the divergence angles of the beams. The angles of the shields with respect to each other and the runway are precisely controlled to generate an accurately positioned glide slope and course to the runway. In one embodiment a center light beam of a first color has an axis extending along the glide slope and course to the runway. In one embodiment a center light beam of a first color has an axis extending along the glide slope and course to the runway. A first pair of different colored beams extend along the top and bottom of the center beam for indicating deviations from the glide slope, and a second pair of different colored beams extend along opposite sides of the center beam for indicating deviations from the course to the runway. In a second embodiment a pair of vertically aligned light beam generators which are angled with respect to each other are pointed toward the aircraft with the lower edge of the top beam intersecting the upper edge of the bottom beam. The lights are of different colors so that the interface between the two beams defines the glide slope. In order to prevent color mixing, it may be desirable to alternately illuminate each of the light beam generators so that light is seen from only one light beam generator at a time. In a third embodiment two spaced units are used to define the glide slope, each having a pair of vertically aligned beams with the lower edge of the top beam extending along, but separated from, the upper edge of the lower beam. The first unit is positioned near the end of the runway with adjacent edges of the vertically aligned beams coincident with the lower edge of the glide path. The second unit is positioned approximately 500 feet further down the runway with the adjacent edges of the vertically aligned beams coincident with the upper edge of the glide path. The bottom beams of both units are visible when the aircraft is below the glide path, the top beam of the first unit and the bottom beam of the second unit are visible when the aircraft is on the glide path, and both top beams are visible when the aircraft is above the glide path. In a fourth embodiment, two units placed alongside a center unit may be used to produce, through a triggering sequence, apparent motion to the pilot of an airplane to adjust his craft to the proper approach course. In a final embodiment, multiple light beams are triggered sequentially to produce an apparently moving color pattern, and the direction of apparent motion indicates the vertical direction to be flown to intercept the glide path.

7 Claims, 14 Drawing Figures

VISUAL APPROACH SYSTEM FOR AIRCRAFT

CROSS REFERENCE TO RELATED APPLICATION

This is a continuation-in-part of application Ser. No. 772,077, now abandoned, filed Feb. 25, 1977.

BACKGROUND OF THE INVENTION

1. Field of the Invention

This invention relates to aircraft guidance systems and, more particularly, to a visual approach system for guiding an aircraft to a runway along a precisely located glide slope and course.

2. Description of the Prior Art

During the approach of an aircraft to the runway for landing, it is essential that the pilot maintain the aircraft at the appropriate angle with respect to his intended point of touchdown on the runway. This line of approach, often referred to as the glide slope or glide path, must be maintained substantially constant within relatively narrow limits and the line must be measured with respect to the same given point of expected touchdown. Any material variance from this line of approach may cause the aircraft to strike an obstruction such as a tree or power line, or may cause touchdown of the aircraft on the runway at a point either short of the end of the runway or dangerously far down the runway toward the opposite end thereof as a result of an improperly chosen touchdown point. Similarly, it is necessary for the aircraft to follow a course which is aligned with the center line of the runway to insure a landing on the center of the runway and prevent the aircraft from striking objects which project upwardly on one side of the glide slope.

Conventional techniques have been developed for solving the foregoing problem to some extent. For example, the well-known instrument landing system (ILS) enables the pilot of an airplane to maintain his craft on the proper approach path as defined by appropriate radio beams transmitted from the ground. Also, at airports equipped with ground-controlled approach (GCA) equipment, the pilot can be talked down by the ground controller if the need arises. Both of the foregoing techniques, however, require the presence on the ground of elaborate and expensive equipment, and the ILS system additionally requires the presence in the aircraft of radio receiving apparatus which is expensive and which adds weight to the craft. Because of this, many of the smaller public airports and virtually all private airports are equipped with neither of the aforenamed landing aids. Furthemore, a substantial number of smaller aircraft are not equipped with ILS apparatus because of the added expense of such apparatus.

Although choosing and flying the proper approach path presents no particular problem to the skilled pilot during VFR (visual flying regulations) conditions, nighttime landings for the pilot whose plane is not equipped with ILS or who is landing at an airport having neither ILS nor GCA equipment presents a very real hazard. The magnitude of this hazard may be increased when the pilot is landing at a field having only relatively rudimentary lighting.

While various means have been devised which cause the pilot to see differing illumination patterns and/or colors depending on his position relative to the proper approach path and course, such means have been relatively expensive, unwiedly or otherwise unsuited to the needs of small airports.

SUMMARY OF THE INVENTION

It is an object of the invention to provide a visual approach system for optically guiding n aircraft to a runway along a predetermined glide slope and course.

It is another object of the invention to provide a visual approach system which generates positional indications that are relatively easy for a pilot to interpret.

It is a further object of the invention to provide a visual approach system which can be produced for relatively little cost.

These and other objects of the invention are accomplished by a visual approach system having a plurality of light beam generators of different colors precisely arranged with respect to each other and the airport runway. The light emanating from each of the light beam generators has a precisely controlled angle of divergence so that the interfaces between adjacent light beams accurately follow a preset pattern. In one embodiment a center light beam has an axis extending along the glide slope and course. A first pair of different colored light beams extend along opposite sides of the center beam to provide an indication that the aircraft has deviated from the preset course, and a pair of different color light beams extending above and below the center light beam provides an indication that the aircraft is either above or below the preset glide slope. In a second embodiment, a pair of different color light beams occupying a common vertical plane are projected toward the aircraft. The lower edge of the upper beam extends along and intersects the upper edge of the lower beam, the intersection between the two beams defining the predetermined glide slope. The appearance of two different color beams to the operator of an approaching aircraft indicates that the aircraft is on the proper glide slope. In a third embodiment two spaced apart identical units, each having a pair of different colored light beams occupying a common vertical plane, are employed to define the glide slope. These units are positioned such that the lower edge of the upper beam emanating from each unit is substantially parallel to, but does not intersect the upper edge of each lower beam. The units are also positioned such that the adjacent edges of the light beams from the first unit are coincident with the lower edge of the glide slope and the adjacent edges of the light beams of the second unit are coincident with the upper edge of the glide slope. The aircraft position below the glide slope is defined by the lower light beams from both units, on path by the upper light beam from the first unit and the lower light beam from the second unit, and above path by the upper light beams from both units.

In a variation of the second embodiment, two units placed alongside a center unit may be used to produce apparent motion in the horizontal plane at right angles to the runway. The apparent motion indicates the direction to be flown to intercept the approach course.

In a final embodiment, multiple light beams are arranged to produce apparent motion in the vertical plane to indicate the direction to be flown to intercept the glide path. Each of the light beam generators may include a light source facing toward the aircraft and enclosed at the rear end of a tubular, elongated light shield for precisely controlling the divergence angle of the light emanating from the light source. The light sources may be alternately illuminated so that only one light is visible to the pilot at a time to prevent color mixing between intersecting light beams.

DETAILED DESCRIPTION OF THE INVENTION

Figure 1:
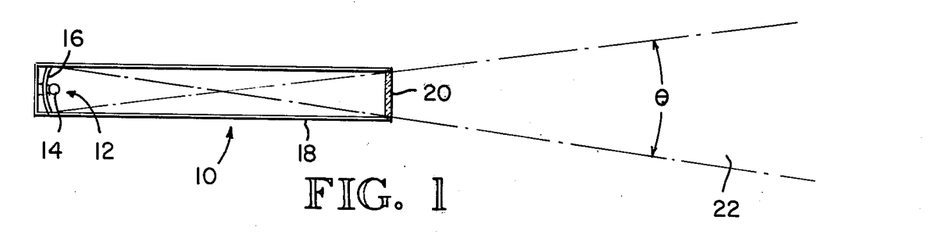
FIG. 1 is a cross-sectional view of a light beam generator utilized in the visual approach system of the invention.

A light beam generator utilized in the visual approach system for providing a beam of colored light having a preset divergence angle is illustrated in FIG. 1. The light beam generator includes a light source 12 facing toward the aircraft (not shown) which may include a conventional light bulb 14 mounted at the focal point of a parabolic reflector 16. Alternately, a xenon strobe or other gaseous discharge light (not shown) may be substituted for the incandescent light 14 so that the light source 12 is periodically energized. The equipment provided for powering the bulb 14 is conventional and is not described in greater detail herein. The light source 12 is mounted at the rear end of a tube having a height H, width W and a length L. The tube is preferably coated on its interior surfaces with a suitable non-reflective coating. A color filter 20 may extend across the forward end of the tube 18 to transform the white light emanating from the lamp 14 to a beam of light 22 having a color determined by the color filter 20. The light beam generator 10 produces a beam 22 which is a function of the dimensions of the tube. The beam emitted from the tube has an angle of divergence which can be defined mathematically by the following equation:

$$\phi = 2 \arctan H/L \quad \text{or} \quad \phi = 2 \arctan W/L$$
$$\text{for the vertical plane} \quad \text{for the horizontal plane}$$

By adjusting the dimensions H and L of the tube 18, any desired beam divergence angle in the vertical plane can be obtained. It will be understood that the angle of divergence illustrated in FIG. 1 is for the vertical plane only. If the tube 18 illustrated in FIG. 1 is a rectangular tube, the width of the tube (in a horizontal plane) will be different from the different angle of divergence in the horizontal plane than in the vertical plane. In one operation embodiment of the present invention, a tube 80 inches in length, 1.25 inches in height and 3.75 inches in width produces a beam divergence angle of 1.75 degrees in the vertical plane and 5.35 degrees in the horizontal plane.

Figure 2:
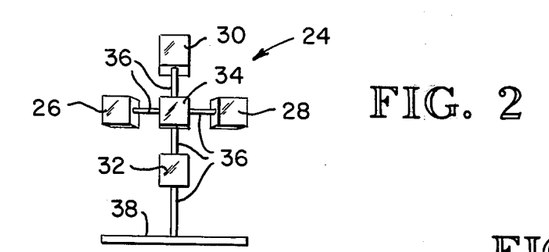
FIG. 2 is a rear view of the first embodiment of the visual approach system for indicating a predetermined glide slope and course of an airplane to an airport runway.

FIG. 2 illustrates an embodiment of the visual approach system capable of providing glide slope and course indications and includes four light beam generators 26, 28, 30 and 32 symmetrically arranged about a center light beam generator 34. The light beam generators 26 to 34 are rigidly interconnected by a frame 36 so that the angles of the light beam generators with respect to each other are precisely controlled. The frame 36 is mounted on a fixed platform 38 so that the positions of the light beam generators 26 to 34 with respect to the runway can be precisely controlled. The light beam generators 26 to 34 are illustrated in FIG. 2 as being square in cross section, but it will be understood that light beam generators having other cross-sectional shapes may also be used. The center light beam generator 34 emits a light of a first color, for example pink. The axis of the center light beam extends along the glide slope and course of the aircraft to the runway. The light beam generators 30, 32, which are placed above and beneath the center light beam generator 34 emit different color beams such as white and red, respectively. Similarly, the light beam generators 26, 28, which are placed on opposite sides of the center light beam generator 34 emit different color beams such as yellow and blue, respectively.

Figure 3:
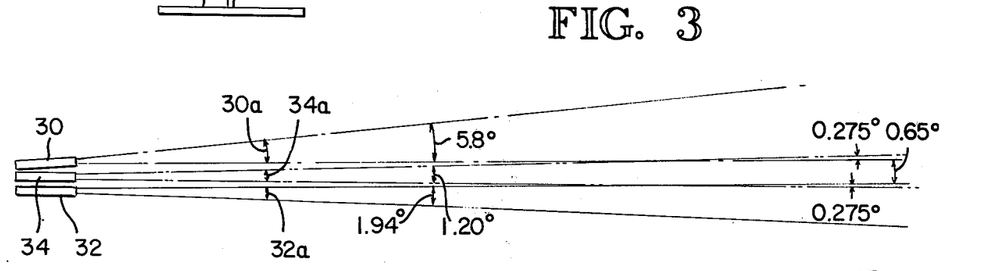
FIG. 3 is a schematic illustrating the beam pattern of the visual approach system of FIG. 2 in a vertical plane.
Figure 4:
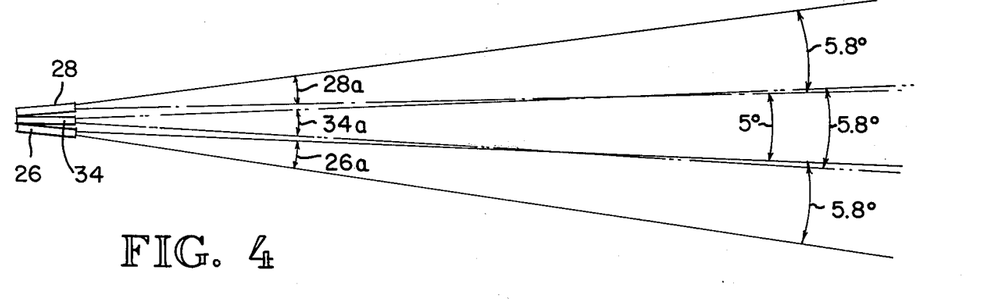
FIG. 4 is a schematic illustrating the beam pattern of the visual approach system of FIG. 2 in a horizontal plane.

With reference to FIGS. 3 and 4, adjacent light beam generators 30, 32 and 34 are angled with respect to each other so that the bottom edge of the top beam 30a and the upper edge of the bottom beam 32a overlap the top and bottom edges of the center beam 34a respectively. The top beam 30a may have an angle of divergence of 5.8 degrees, the lower beam 32a an angle of divergence of 1.94 degrees, and the center beam 34a an angle of divergence of 1.2 degrees in a vertical plane. The upper and lower beams 30a, 32a, respectively, may intersect the center beam 34a at an angle of 0.275 degrees. The pink beam 34a from the center light beam generator 34 defines the glide slope or approach path. The white beam 30a from the light beam generator 30 indicates to the operator of an approaching aircraft that he is above the glide slope. The red beam 32a from the light beam generator 32 indicates that the approaching aircraft is below the glide slope. The perception of both the white beam 30a and the pink beam 34a by the operator indicates that his approaching aircraft is in a transition zone between the upper and lower beams 30a, 34a, respectively. Similarly, perception of the red beam 32a and the pink beam 34a indicates that the approaching aircraft is in a transitional zone between the lower beam 32a and the center beam 34a.

The angle of intersection between the center beam 34a and the upper and lower beams 30a, 32a, respectively, is obtained by displacing adjacent light beam generator tubes 30, 32 and 34 from each other a tube displacement distance (D) calculated according to the formula:

$$D = H + L \tan S/2$$

where H is the height of the tubes in inches, L is the length of the tubes in inches, and S is the angle desired between the transition zones at the upper and lower edges of the glide slope. S is shown as 0.65° in FIG. 3. Should any spacing exist at the rear of the adjacent tubes, this must be added to the calculated value of D.

The beam pattern in a horizontal plane (FIG. 4) is determined in the same manner as above. Each of the beams 26a and 28a is illustrated as having a divergence angle of 5.8 degrees with the center beam 34a intersecting the right and left beams 26a and 28a, respectively, at an angle of about 0.4 degrees. The light beam 26a is one color, such as yellow, while the light beam 28a is another color, such as blue. Perception of the yellow light beam 26a by an operator indicates that his approaching aircraft is too far to the left of the proper approach course while perception of the blue light beam 28a indicates that the approaching aircraft is too far to the right of the proper approach course. Perception of both the pink light beam 34a and yellow light beam 26a indicates that the approaching aircraft is in a transitional zone slightly to the left of the proper course while perception of the blue light beam 28a and pink light beam 34a indicates that the approaching aircraft is slightly to the right of the proper course.

Where xenon strobe lights are employed as tube light sources, the radiation pattern of the tube which illuminates the approach course in the horizontal plane and the glide path in the vertical plane can be dimensioned so that some overlap occurs with the patterns from the tubes which delineate the right and left edges of the glide path, since the individual strobe lights can be operated in an asynchronous manner, or triggered sequentially, assuring that no two tubes are illuminated at the same time.

If incandescent light sources are triggered such that no two tubes are illuminated at the same time, so as to preclude light color mixing, overlap may be employed.

Such overlap, as described above, is desirable to inform the pilot of an aircraft when he is transitioning to the approach course and path.

The five tubes as illustrated in FIG. 2 are preferably positioned longitudinally such that an arc of radius 74 inches drawn from a point on the centerline of tube 34, 6 inches forward of light source and reflector 12 and 14 will intersect each tube aperture. The five tubes are welded into position. The resultant array is positioned alongside a runway horizontally to obtain the desired approach course and positioned vertically using jack screws or other suitable means to obtain the desired approach path.

It should be noted that, since the front ends of the beam generators are physically separated, gaps exist directly in front of the approach system where no light is present. However, the light beams will converge at a point dependent upon the convergence angle of the two beams. The convergence distance between two beams can be calculated using the convergence angle of the two beams which, by reference to FIG. 3 is:

$$\frac{1.75° - 1.2°}{2} = 0.275°$$

and calculating the convergence distance by the following equation:

$$\text{convergence distance} = \frac{\text{tube displacement distance}}{\tan 0.275°}$$

For example, beam 34a intersects beam 30a at an angle of 0.275 degrees. Thus the convergence distance for a 4.53 inch tube displacement (D) is 4.53″/tan 0.275 equal to 943″ or 78.65 feet.

This provides a very accurate method for precisely positioning tube 30 with respect to tube 34 as follows; a theodolite is place 78.65 feet from the aperture of the center of the tube 34 and the displacement distance is adjusted between the tubes 30 and 34 until their respective light radiation pattern edges just converge. In a similar manner displacement may be adjusted for tube 32 with respect to tube 30.

Referring to FIG. 4, the convergence angle for light emanating from tube 34 patterns relative to those of tubes 26 and 28 is:

$$\frac{5.80° - 5.0°}{2} = 0.4 \text{ degrees}$$

and, as previously described with regard to the convergence distance, can be used to adjust the displacement distance of tubes 26 and 28 with respect to tube 34.

It will be understood that the light radiation pattern, dimensions and the approach course and path dimensions used herein are illustrative only and are not to be considered limiting. Any desired parameters may be obtained by varying the dimensions of the tubes and/or array. Also, multiple tubes may be aligned in the same plane to produce light radiation patterns having dimensions equal to that of a single tube but producing greater light output due to the multiple light sources.

Figure 5:
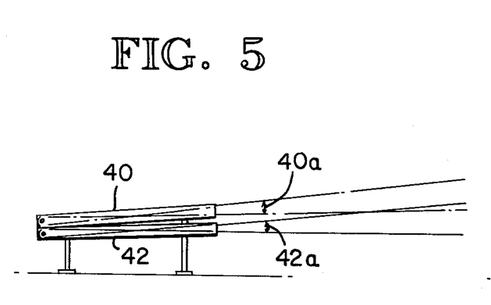
FIG. 5 is a vertical schematic illustrating the beam pattern of another embodiment of a visual approach system.

A second embodiment of a visual approach system is illustrated in FIG. 5. This embodiment provides only glide slope information and includes a pair of light beam generator tubes 40, 42 having the structure illustrated in FIG. 1 which diverge away from each other toward the approaching aircraft (not shown). The upper beam 40a from the upper light beam generator 40 is of one color, for example white, while the beam 42a from the lower light beam generator 42 is of another color, for example red. The angles of divergence of the beams 40a, 42a are calculated according to the formula previously given, and the angle at which the beams 40a, 42a intersect each other is calculated according to the following formula:

$$D = 2H - 2L \tan S/2$$

where D is the displacement distance between the fronts of the tubes plus the distance, if any, at the rear of the tubes, H is the height of the tubes in inches, L is the length of the tubes in inches, and S is the desired glide slope angular width. For a given D, the formula may be solved for S, or conversely, for a given S, solved for D.

In the embodiment illustrated in FIG. 5, the glide slope is delineated by the intersection between the upper and lower beams 40a, 42a, respectively so that perception of the white beam 40a indicates to the operator of an approaching aircraft that he is too high. Perception of only the lower beam 42a indicates that the aircraft is too low, and perception of both the upper and lower beams 40a, 42a, respectively, indicates that the aircraft is on the glide slope. In order to prevent color mixing it may be desirable to alternately illuminate the upper and lower light beam generators so that a periodic white flash indicates an altitude above the glide slope, a periodic red flash indicates an altitude below the glide slope and alternating white and red flashes indicates an altitude on the glide slope.

Figure 7:
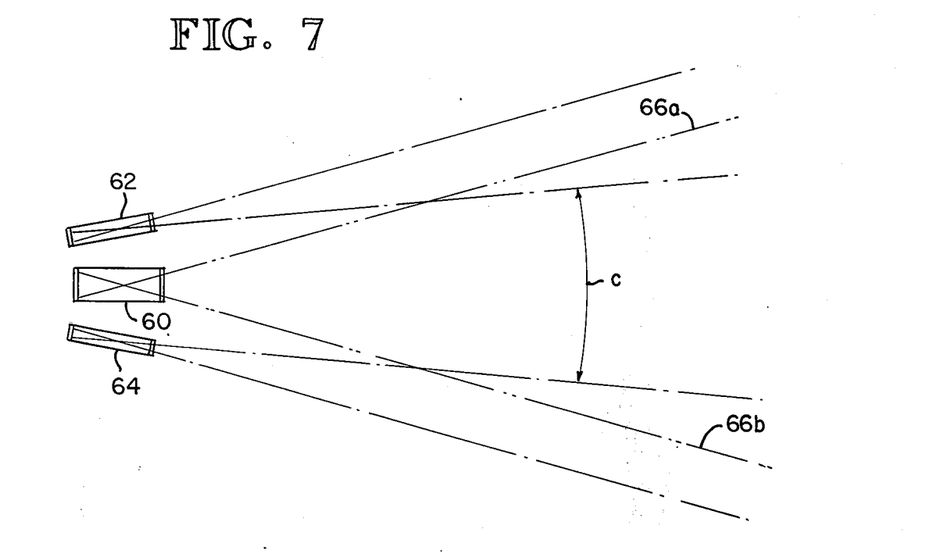
FIG. 7 is a schematic of the horizontal beam patterns of a variation of the embodiment depicted in FIG. 5.

A further modification of the invention is illustrated in FIG. 7 which utilizes three units of the type shown in FIG. 5, a center set of units 60 and adjacent sets of units 62 and 64 alongside the center unit placed such that the three units occupy a common horizontal plane and are oriented horizontally so that the light radiation pattern from the units 62 and 64 extend laterally beyond the edges 66a and 66b of the desired course angular arc. The beams of the units 62 and 64 may be triggered in a sequence which will produce flashing red light below the desired glide path, flashing white light above the desired glide path and alternately flashing red and white light when on the desired glide path and, in addition, produce an effect of apparent motion of the light source in the horizontal plane indicating to the pilot or the operator of the aircraft the direction he should fly to reach the desired approach course. When the operator of the aircraft is on course only the light output of the center tubes 60 is seen. The outer edges of the light radiation patterns of all the units may be set coincide in the horizontal plane by adjusting the width of the outer tubes 62 and 64 with respect to the width of the center tubes 60.

The triggering sequence which will produce the apparent motion previously referred to to direct the operator of an aircraft to the desired approach course is the following repetative cycle:
 outer red lights;
 center red light;
 outer white lights; and
 center white light.

The sequence may be triggered so that each of the lights is on for approximately ¼ second with the cycle being repeated each second. The speed of the apparent motion may be varied by varying the spacing distance of the outer units 62 and 64 from the center unit 60 in the horizontal plane. The speed of the apparent motion is directly proportional to the spacing distance.

Tests have shown that a spacing distance of about 18 inches measured from the forward ends of the units between the center unit 60 and the outer units 62 and 64 produces an apparent motion indication which is adequate for approach ranges of 2 to 3 miles which are normally used by light aircraft. Greater spacing distances may be required for longer approach ranges.

The means for sequentially triggering the light sources of the three pairs of units illustrated in FIG. 7 can be provided by one skilled in the art without any problem. Such triggering devices are commercially available and form no part of this invention.

Figure 6:
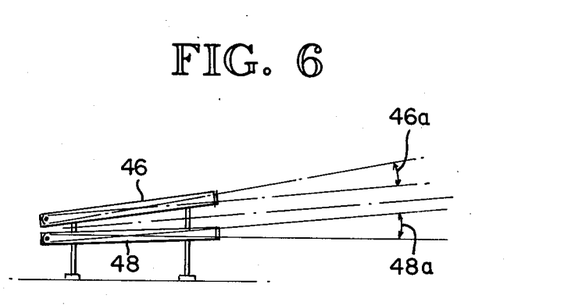
FIG. 6 is a vertical schematic of the beam pattern of still another embodiment of the visual approach system.
Figure 8:
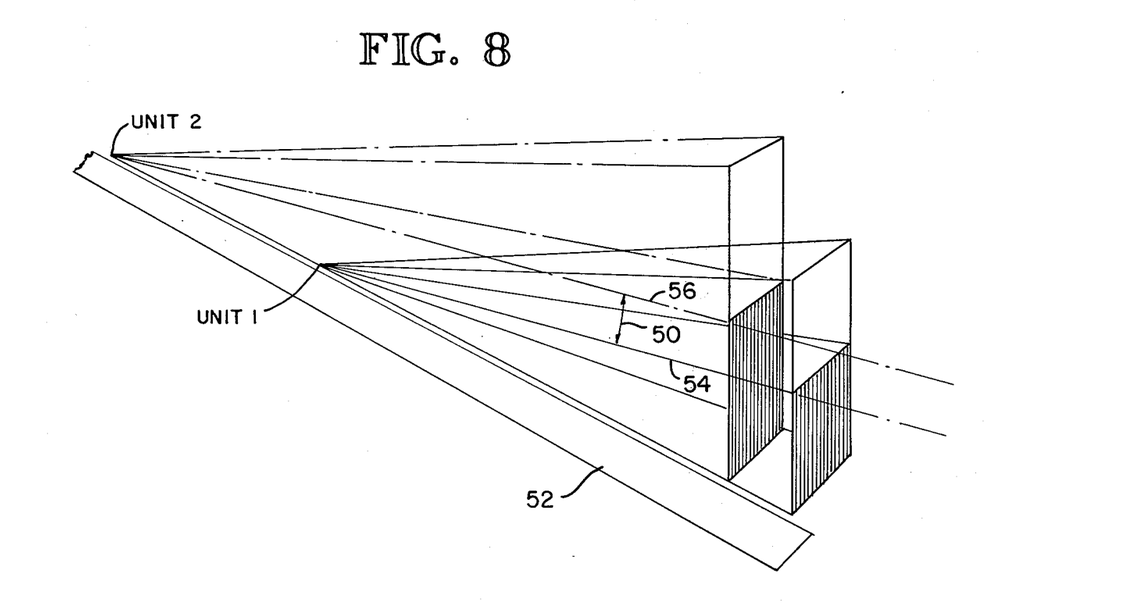
FIG. 8 is a schematic illustrating the beam pattern of the third embodiment visual approach system employing dual units of the type illustrated by FIG. 6.

A third embodiment of the visual approach system is illustrated in FIG. 6 in which a pair of light beam generators 46, 48 are angled away from each other such that the beams 46a, 48a emanating therefrom are spaced apart from each other with the lower edge of the upper beam 46a being parallel to the upper edge of the lower beam 48a. Each of the beams 46a, 48a are of different colors, for example white and red, respectively. Two such units as described above are required to define the glide slope 50 as illustrated in FIG. 8. The first unit array is positioned near the end of the runway 52 e.g. a distance of 500–600 feet from the runway threshold with the adjacent edges of its lower and upper light beams 54 aligned with the bottom edge of the desired glide slope. The second unit array is positioned some distance, e.g. 500 feet, from the first unit further down the runway in the same position relative to the edge of the runway as the first unit and with the adjacent edges of its lower and upper light beams 56 aligned with the top edge of the glide slope. Thus, perception of two red beams indicates that the aircraft is below path, perception of a white and red beam indicates that the aircraft is on path, and perception of two white beams indicates that the aircraft is above path. It will be understood that the physical separation of the positions of the two units precludes light mixing and each unit is perceived as an individual light source.

Figure 9:
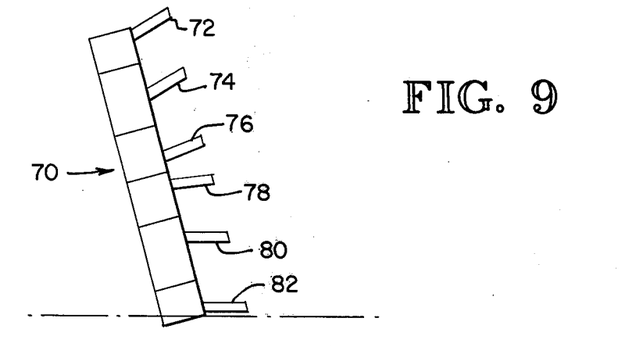
FIG. 9 is a cross-sectional view of a final embodiment of a visual approach system producing a color pattern and apparent motion in the vertical plane.

A final embodiment of the visual approach system is illustrated in FIG. 9 in which an array of light beam generators 70 is positioned in the vertical plane such that a first light means 72 of a first color, for example white, is positioned at the top of the array. A second light means 74 of the first color is positioned at the midpoint between the top and center of the array. A third light means 76 of the first color is positioned above and immediately adjacent to the array center.

A fourth light means 78 of a second color, for example red, is positioned below and immediately adjacent to the array center. A fifth light means 80 of the second color is positioned at the midpoint between the array center and the bottom of the array. A sixth light means 82 of the second color is positioned at the bottom of the array.

Figure 10:
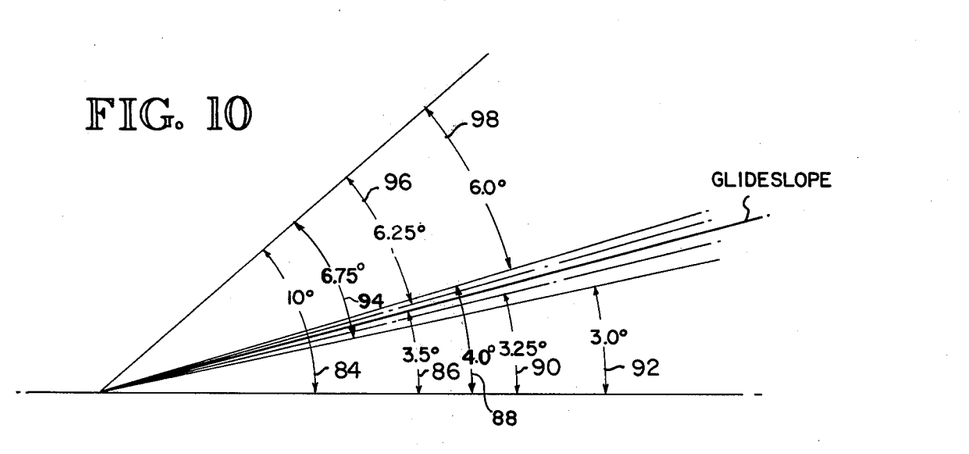
FIG. 10 is a vertical schematic illustrating the beam patterns of the final embodiment of a visual approach system.

Light means 72–82 are dimensioned and oriented with respect to the array such that the light beam patterns are as illustrated in FIG. 10. The total vertical coverage 84 is set at 10 degrees in this embodiment, but may be set to any desired value. The approach path angle 86 is set at 3.5 degrees in FIG. 10.

Referring now to FIG. 10, the first beam pattern 98 is oriented such that it extends from a plane surface ½ of a degree above the glide path angle 86, upward to the upper coverage limit 84. The second beam pattern 96 extends from a plane surface ¼ of a degree above the glide path angle 86, to the upper coverage limit, 84. The third beam pattern 94 extends from a plane surface ⅛ of a degree below the glide path angle 86 to the upper coverage limit 84. The fourth beam pattern 88 extends from a plane surface ⅛ of a degree above the glide path angle 86 downward to the horizontal plane, or zero degrees. The fifth beam pattern 90 extends from a plane surface ¼ of a degree below the glide path angle 86, downward to the horizontal plane. The sixth beam pattern 92 extends from a plane surface ½ of a degree below the glide path angle 86 downward to the horizontal plane.

The beams of the light means 72–82 may be triggered as explained hereinafter in a sequence which will produce flashing light of first color above the glide path angle 86 by more than ½ of a degree, flashing light of second color below the glide path angle 86, by more than ½ of a degree, and alternately flashing light of first and second color when within plus or minus ½ of a degree from the glide path angle 86.

In addition, the triggering sequence will produce an effect of apparent motion in the vertical plane indicating the direction to be flown to reach the desired glide path angle 86. This apparent motion occurs any time an aircraft deviates from the path angle 86 by more than ¼ of a degree.

The triggering sequence which produces this effect of apparent motion is:
 First light means of first color;
 Second light means of first color;
 Third light means of first color;

Sixth light means of second color;
 Fifth light means of second color; and
 Fourth light means of second color.

The sequence may be triggered so that each of the lights is on for approximately ¼ of a second with the cycle repeated each 1¼ seconds.

Figure 11:
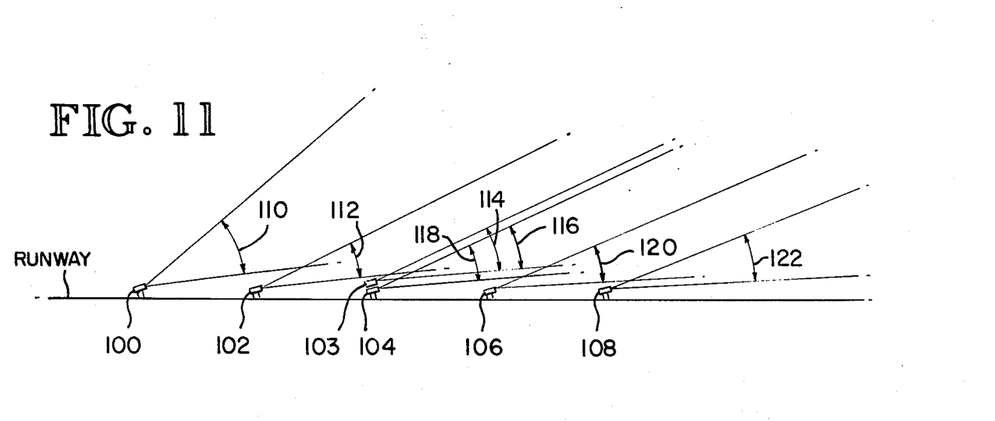
FIG. 11 is a cross-sectional view of a variation of the embodiment illustrated in FIG. 9

The embodiment may also be constructed as a linear horizontal array along the side of and parallel to the runway as shown in FIG. 11. The array length must be greatly expanded to obtain the same visual height as is obtained with a vertical array. For example, a spacing of 100 feet between each of the light beam generators 11–108 will produce a visual array height to an aircraft operator flying a 3° glide path angle of 20 feet, determined as follows:

Visual array height = 400′ × tan 3° = 20′.

When installed as a linear horizontal array, light beam generators 100–108 are constructed as individual units and positioned as illustrated in FIG. 11. First light beam generator 100 emits a light beam 110 of a first color oriented such that it extends from a plane surface at the upper edge of the glide path, upward to the upper coverage limit desired. Second light beam generator 102 is positioned in line with and some distance, 100 feet for example, from the first light beam generator, toward the approach end of the runway. Its light beam 112 is of the first color, and it extends from a plane surface one-half the angular width between the path center and upper edge, to the upper coverage limit.

Third and fourth light beam generators 103, 104, respectively, are a single unit similar to that shown in FIG. 5, and are positioned in line with, and the same distance from, the second light beam generator 102 toward the approach end of the runway.

The third light beam 114, of the first color, extends from a plane surface at the lower edge of the glide path, upward to the upper coverage limit.

The fourth light beam 118 of a second color, extends from a plane surface at the upper edge of the glide path, downward to the horizontal plane.

The fifth light beam generator 106 is positioned toward the approach end of the runway in line with the generators 100–104. The spacing between the fifth light beam generator 106 and the third and fourth light beam generators 103, 104, respectively, is equal to the spacing between those generators 103, 104 and the second light beam generator 102. The light beam 120 of the fifth light beam generator 106 is of the second color, and it extends from a plane surface one-half the angular width between path center and lower edge, downward to the horizontal plane.

The sixth light beam generator 108, is positioned in line with, and the same distance from, the fifth light beam generator 106, toward the approach end of the runway. Its light beam 122 of the second color extends from a plane surface at the lower edge of the glide path, downward to the horizontal plane. The glide path upper and lower edges are shown at 116.

The array is triggered sequentially in a manner identical to that used for the vertical array of FIGS. 9 and 10. This is:
 First light means of first color;
 Second light means of first color;
 Third light means of first color;

Sixth light means of second color;
 Fifth light means of second color; and
 Fourth light means of second color.

Thus, for both the vertical and the linear horizontal arrays of this embodiment, an aircraft operator sees the same indications of his position above path, below path, or on path. If he is within the airspace enclosed by the glide path plus or minus ¼ of a degree, he will see alternately flashing light of first and second color with no apparent motion. If he is within the airspace enclosed by ¼ of a degree above the glide path angle and ½ of a degree above the glide path angle, he will see alternately flashing light of first and second color and the first color light will have apparent motion consisting of one downward movement. If he is within the airspace enclosed by the upper path edge and the upper coverage limit, he will see flashing light of first color only, and the first color light will have apparent motion consisting of two downward movements. If he is within the airspace enclosed by ¼ of a degree below the glide path angle and ½ of a degree below the glide path angle, we will see alternately flashing light of first and second color and the second color light will have apparent motion consisting of one upward movement. If he is within the airspace enclosed by the lower path edge, downward to the horizontal plane, he will see flashing light of second color, and the second color light will have apparent motion consisting of two upward movements.

Although six light beam generators are used in this embodiment, this is by way of illustration and not limitation. More or less generators may be used and the triggering sequence modified accordingly.

Figure 12:
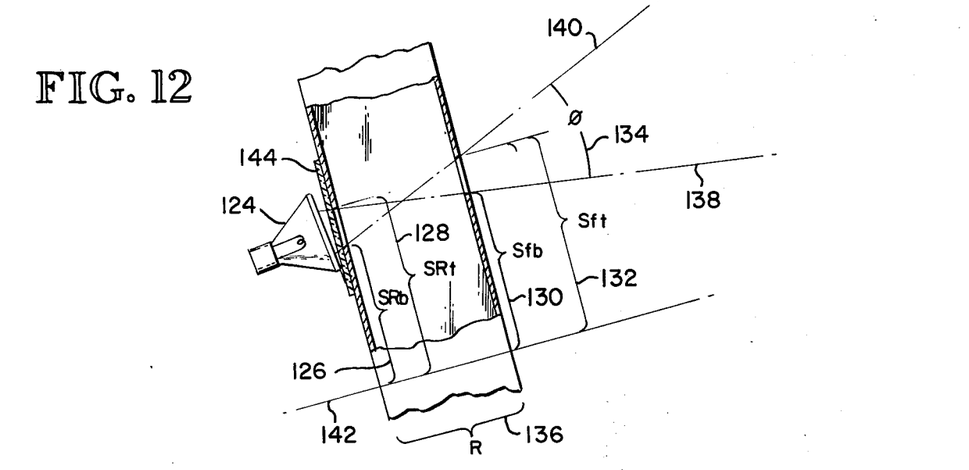
FIG. 12 is a cross-sectional view of another concept of a light beam generator utilized in the visual approach system of the invention.

It should be noted that the aiming tubes used in all of the embodiments herein may be combined into a single enclosure of appropriate dimensions which consists of apertures at the rear and front of the enclosure which accomplish the same function as the rear and forward ends of the aiming tubes as illustrated in FIG. 12. Interior partitions or baffles within the enclosure isolate each section of the enclosure such that each forward aperture receives illumination only from its associated rear aperture light source. Aperture spacing and dimensions are determined using the same general types of trigonometric equations as are used for aiming tubes. As illustrated in FIG. 12, aperture height is:

$S_{ft} - S_{fb}$ and $S_{rt} - S_{rb}$ and the beam angle $\theta$ 34 is equal to the light ray angle shown at 140 minus the light ray angle shown at 138. This is:

$$\theta = \tan^{-1}\frac{Sft - Srb}{R} - \tan^{-1}\frac{Sfb - Srt}{R}$$

Where Sft, shown at 132, is the distance to the top of the front aperture; Sfb, shown at 130, is the distance to the bottom of the front aperture; Srb, shown at 126, is the distance to the bottom of the rear aperture; and Srt, shown at 128, is the distance to the top of the rear aperture, all measured from a reference line, shown at 142, drawn through the array center. R, shown at 136 is the distance between front and rear apertures surfaces. Light source 124 provides aperture illumination, and color filter 144 provides the desired light color. As previously noted, multiple apertures may be aligned in the same plane to increase the light intensity while maintaining the pattern dimensions of a single pair of apertures.

Figure 13:
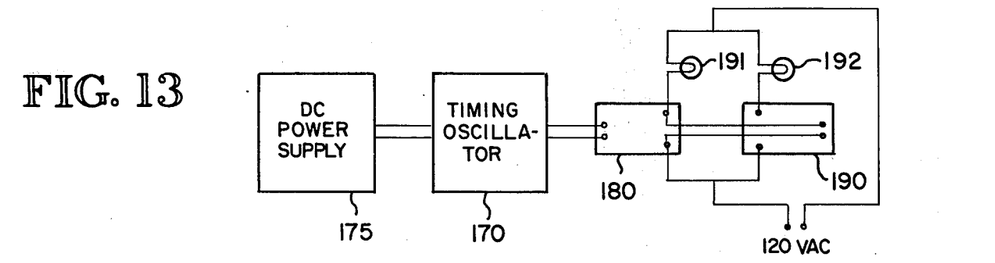
FIG. 13 is a schematic of a control system for alternately illuminating the light beams in the embodiment of FIG. 5.

One system for alternately illuminating a pair of lights as in FIG. 5 or FIG. 6 is illustrated in FIG. 13 and includes an oscillator 170 consisting of an integrated circuit timer which produces alternately high and low output signals. The output signals are applied to the input terminals of a solid state relay 180. Relay 180 is connected such that its output terminals are in series with light 191, with a parallel connection to the input terminals of solid state ac relay 190. Thus, when conduction occurs through relay 180 the ac voltage at the input terminals of relay 190 is zero since the entire 120 V ac is dropped across the light 191. Conversely, when the output terminals of relay 180 are non conducting, 120 V ac is applied to relay 190 input terminals causing conduction through its output terminals which are connected in series with lamp 192. Each lamp is energized a time equal to one-half cycle of the timing oscillator output which is adjustable by external resistors and a capacitor, not shown. DC power is supplied from power supply 175.

Figure 14:
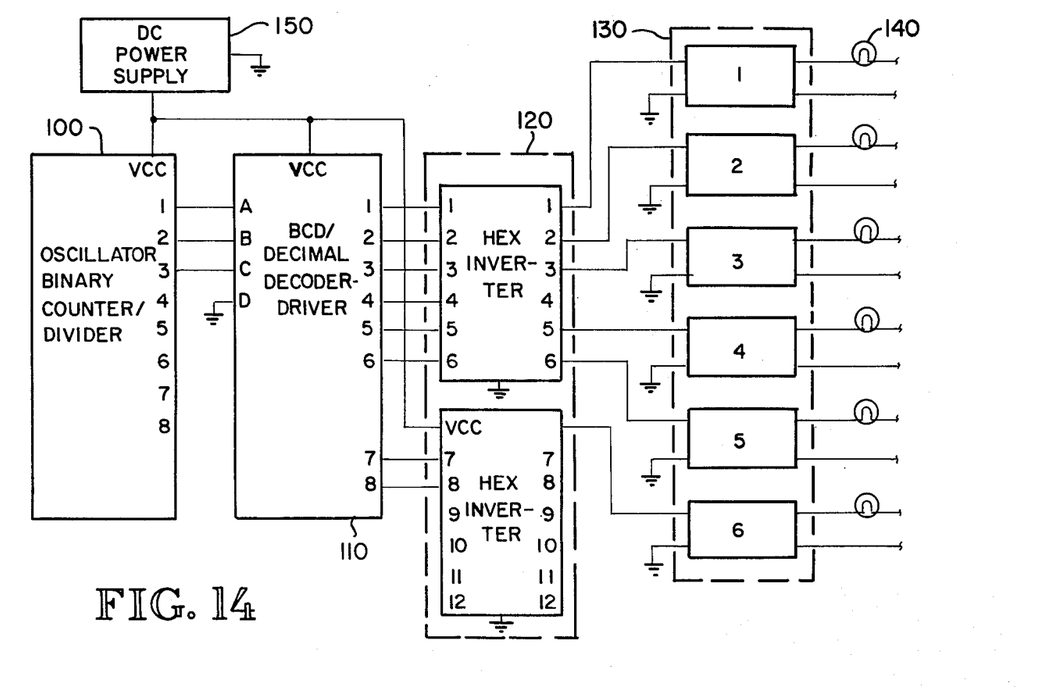
FIG. 14 is a schematic of a control system for sequentially illuminating the light beams in the embodiments of FIGS. 9–11.

The system for sequentially illuminating the light means 72-82 and 100-108 illustrated in FIGS. 9-11 is shown in FIG. 14.

Oscillator and binary counter/divider 100 contains an integral oscillator and an 8 output binary counter/divider. The circuit requires the addition of various external resistors and capacitors, not shown. The frequency of the integral oscillator is adjustable and is determined by a single resistor and capacitor. Only the first three bits are used in this circuit to produce the desired triggering sequence. These outputs are applied to binary coded decimal to decimal decoder-driver 110 which has eight normally high outputs each of which are sequentially driven to zero volts.

The outputs of circuit 110 are applied to a pair of hex inverters 120. The outputs from the hex inverters 120 are a sequential train of output voltage pulses 1 through 8 which may be used in various combinations to produce the desired triggering sequence. For a four light system, four sequential pulses may be obtained by tying together outputs 1 and 2, 3 and 4, 5 and 6, 7 and 8. For a six light system outputs 1, 2, 3 and 5, 6, 7 may be utilized with blank time intervals at 4 and 8. For an 8 light system, each output is used.

The appropriately selected outputs from the hex inverters are applied to solid state relays 130. These relays are 3-30 V dc input relays which provide conduction between output terminals when their respective inputs are high and an open circuit between their output terminals when the respective inputs are low.

Each of the lamps, shown at 140, is in series with the output terminals of an associated relay and are supplied with 120 Vac. The lamps are thus energized in one of the sequences described above.

Power supply 150 supplies dc power to all the electronic triggering circuitry.

The visual approach system of the present invention is capable of inexpensively guiding an aircraft to a runway over a predetermined and accurately positioned glide slope and course.

I claim:

1. A visual approach system for indicating the glide path of an aircraft to a runway so that the operator of an aircraft using the system sees an apparent upward motion when below the air space enclosed by predetermined glide path, an apparent downward motion when above the air space enclosed by the predetermined glide path, and alternating flashing lights of first and second colors with no apparent motion when within the glide path, the approach system comprising:

a single light generating unit positioned along the runway including means for generating a third and fourth light beam of a first and second color respectively, the light generating unit adjusted such that the third light beam pattern extends from the lower edge of the glide path upward and the fourth light beam pattern extends from the upper edge of the glide path downward, a second light generating unit positioned in line with and spaced from the single light generating unit toward the departure end of the runway, the second light generating unit including means for generating a second beam of light of the first color, the unit adjusted so that the second beam overlaps the upper edge of the fourth light beam pattern and glide path and extends upward, a first light generating unit positioned in line with and spaced from the second and single light generating units toward the departure end of the runway, the first light generating unit including means for generating a first beam of light of the first color, the unit adjusted so that the first light beam pattern extends from the upper edge of the fourth light beam pattern and glide path upward, a fourth light generating unit positioned in line with and spaced from the single light generating unit toward the approach end of the runway, the fourth light generating including means for generating a fifth beam of light of the second color, the unit adjusted so that the fifth beam overlaps the lower edge of the third light beam pattern and glide path and extends downward, a fifth light generating unit positioned in line with and spaced from the single light generating unit and fourth light generating unit toward the approach end of the runway, the fifth generating unit including means for generating a sixth beam of light of the second color, the unit adjusted so that the sixth light beam pattern extends from the lower edge of the third light beam pattern and glide path downward, and control means for sequentially illuminating the light beams of the respective light generating units as follows:

first light beam of first color
second light beam of first color
third light beam of first color
sixth light beam of second color fifth light beam of second color and
fourth light beam of second color,
so that the operator of an aircraft above the glide path sees a downwardly moving light of the first color with the number of downward movements being increased for greater deviations from the glide path; sees an upwardly moving light of the second color when below the glide path with the number of upward movements increased for greater deviations from the glide path; and sees alternating flashing lights of first and second color with no apparent motion when within the glide path.

2. The visual approach system of claim 1, wherein said light means are arranged in a linear horizontal array alongside and parallel to the runway with the first light generating unit positioned a distance D from the approach end of the runway, the second light generating unit positioned a distance 3D/4 from the approach end of the runway, the single light generating unit positioned symmetrically about a distance D/2 from the approach end of the runway, the fourth light generating unit positioned a distance D/4 from the approach end of the runway, and the fifth light generating unit positioned at the approach end of the runway.

3. The visual approach system of claim 1 wherein each of said light units comprise at least one elongated tube enclosing a forwardly directed lamp at its rearward end and a color filter forward of said lamp, said tube having a length L, a height H, and a width W selected such that said light beams have a predetermined divergence angle in he L,H plane of 2 arctan H/L and a predetermined divergence angle in the L,W plane of 2 arctan W/L.

4. The visual approach system of claim 3, wherein the inside surfaces of said tubes are non-reflective to restrict the divergence angle of the light beams emanating from said tubes.

5. The visual approach system of claim 1 wherein each of said light units includes an enclosure having forward aperture surfaces, rear aperture surfaces spaced a distance R from said forward surfaces, a forwardly directed light beam source at the rear apertures, internal baffle means within the enclosure so that each of the forward apertures receives illumination only from its associated rear aperture light beam source, the outer edges of said forward apertures being spaced a distance Sft from a reference line drawn through the center of said enclosure, the inner edge of said forward apertures being spaced a distance Sfb from the reference line, the outer edge of said rear apertures being spaced a distance Srt from the reference line, the inner edge of said rear apertures being spaced a distance Srb from the reference line, and a color filter forward of said light beam source, with each associated pair of forward and rear apertures of each light unit generating a beam of light having a divergence angle of $$\arctan \frac{Sft - Srb}{R} - \arctan \frac{Srb - Srt}{R}$$

with the outer beam edge being $$\arctan \frac{Sft - Srb}{R}$$

and the inner beam edge being $$\arctan \frac{Srb - Srt}{R}$$

6. The visual approach system of claim 5, wherein the inside surfaces of said enclosure are non-reflective to restrict the divergence angle of the light emanating from the apertures of said enclosure.

7. The visual approach system of claim 1 wherein the lower beam pattern edge of the second beam of light extends along a line which is displaced upward from the glide path center by an angle equal to one-fourth of the glide path width and the upper beam pattern edge of the second light beam extends upward to the upper coverage limit desired; wherein the lower beam pattern edge of the first beam of light extends along a line which is displaced upward from the glide path center by an angle equal to one-half of the glide path width and the upper beam pattern edge of the first beam of light extends upward to the upper coverage limit desired; wherein the upper beam pattern edge of the fifth beam of light extends along a line which is displaced downward from the glide path center by an angle equal to one-fourth of the glide path width and the lower beam pattern edge of the fifth beam of light extends downward to a horizontal plane paralleling the runway; wherein the upper beam pattern edge of the sixth beam of light extends along a line which is displaced downward from the glide path center by an angle equal to one-half the glide path width and the lower beam pattern edge of the sixth beam of light extends downward to the horizontal plane; and wherein the third and fourth beams of light overlap each other symmetrically about the glide path center by an angle equal to the glide path width with the upper beam pattern edge of the beam of light extending upward to the maximum angular coverage desired and the lower beam pattern edge of the fourth beam of light extending downward to the horizontal plane.

* * * * *